United States Patent
Tomura et al.

(10) Patent No.: US 10,598,680 B2
(45) Date of Patent: Mar. 24, 2020

(54) PULSER RING MOUNTING STRUCTURE

(71) Applicant: HONDA MOTOR CO., LTD., Minato-ku, Tokyo (JP)

(72) Inventors: Kineo Tomura, Wako (JP); Yotaro Mori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 268 days.

(21) Appl. No.: 15/810,558

(22) Filed: Nov. 13, 2017

(65) Prior Publication Data

US 2018/0136248 A1 May 17, 2018

(30) Foreign Application Priority Data

Nov. 16, 2016 (JP) ................................. 2016-223064

(51) Int. Cl.
*B60B 27/00* (2006.01)
*G01P 1/02* (2006.01)
*B60T 8/171* (2006.01)

(52) U.S. Cl.
CPC .......... *G01P 1/026* (2013.01); *B60B 27/0068* (2013.01); *B60T 8/171* (2013.01); *B60Y 2400/3032* (2013.01)

(58) Field of Classification Search
CPC ..... B60T 8/329; B60T 1/065; B60B 27/0068; F16D 65/123; B60Y 2400/3032
See application file for complete search history.

(56) References Cited

U.S. PATENT DOCUMENTS 6,492,805 B1 * 12/2002 Wakabayashi .......... B60T 1/065
324/160

FOREIGN PATENT DOCUMENTS

| EP | 2 082 934 A1 | 7/2009 |
| EP | 2 927 021 A1 | 10/2015 |
| JP | 2001-165949 A | 6/2001 |
| JP | 2008-057662 A | 3/2008 |
| JP | 2012-202869 A | 10/2012 |
| WO | 2016/152526 A1 | 9/2016 |

OTHER PUBLICATIONS

Japanese Office Action dated Sep. 25, 2018 in the corresponding patent application No. 2016-223064 and the English machine translation thereof.
Extended European search report dated Apr. 12, 2018 in the corresponding European Patent Application 17201695.8.

* cited by examiner

*Primary Examiner* — Thanh Luu
(74) *Attorney, Agent, or Firm* — Carrier Blackman & Associates, P.C.; William D. Blackman; Joseph P. Carrier (57) ABSTRACT

A pulser ring mounting structure includes: a wheel provided with a hub, the hub being journaled to a rear wheel axle; and a pulser ring, the pulser ring being mounted with respect to the wheel, the pulser ring being provided with an annular detected portion detected by a wheel speed sensor. In the pulser ring mounting structure, the pulser ring is provided with a rib, the rib extending to be located close to a receiving portion, the receiving portion being provided with respect to an outer surface of the hub.

7 Claims, 7 Drawing Sheets

FIG.7

PULSER RING MOUNTING STRUCTURE

INCORPORATION BY REFERENCE

The present application claims priority under 35 U.S.C. § 119 to Japanese Patent Application No. 2016-223064 filed on Nov. 16, 2016. The content of the application is incorporated herein by reference in its entirety.

Technical Field

The present invention relates to a pulser ring mounting structure.

Background Art

Recently, in a saddle riding vehicle, such a pulser ring mounting structure have been known that a pulser ring provided with a detected portion detected by a wheel speed sensor is mounted with respect to a wheel (for example, see Patent Literature 1).

CITATION LIST

Patent Literature

[Patent Literature 1]
JP-A No. 2012-202869

SUMMARY OF INVENTION

Technical Problem

In the meantime, in the above-described existing pulser ring mounting structure, in order to prevent the pulser ring from being plastically deformed by acting external force on the pulser ring during traveling or during maintenance work such as a tire change, it was necessary to thicken the entire pulser ring, and there was room for improvement from the viewpoint of a reduction in weight and costs.

The present invention has been achieved in view of the above-mentioned circumstances, and an object of the present invention is to provide a pulser ring mounting structure capable of suppressing deformation of a pulser ring.

Solution of Problem

According to an aspect of the present invention, there is provided a pulser ring mounting structure including: a wheel (22) provided with a hub (23), the hub (23) being journaled to an axle (19); and a pulser ring (34), the pulser ring (34) being mounted with respect to the wheel (22), the pulser ring (34) being provided with an annular detected portion (60) detected by a wheel speed sensor (35). In the pulser ring mounting structure, the pulser ring (34) is provided with a rib (62), the rib (62) extending to be located close to a receiving portion (70), the receiving portion (70) being provided with respect to an outer surface of the hub (23).

Also, in the above-described invention, the rib (62) may extend in an axial direction of the axle (19), and the rib (62) may be located close to the receiving portion (70).

Also, in the above-described invention, the receiving portion (70) may extend in the axial direction of the axle (19), and the receiving portion (70) may be located close to the rib (62).

Further, in the above-described invention, the hub (23) may be configured to be provided with a cylindrical portion (40), the cylindrical portion (40) covering the axle (19) from an outer peripheral side, and the receiving portion (70) may be configured to be a plane, the plane being formed at an end of the cylindrical portion (40) in the axial direction of the axle (19).

Also, in the above-described invention, in a thickness direction of the rib (62), the receiving portion (70) may be formed to have thickness (t1) greater than thickness (t2) of the rib (62).

Also, in the above-described invention, the rib (62) may be annularly and continuously provided.

Also, in the above-described invention, the pulser ring (34) may be mounted with respect to the wheel (22) in order to form a gap (G) between the rib (62) and the receiving portion (70).

Also, in the above-described invention, the gap (G) may be set to such a size that when the pulser ring (34) is deformed in an elastic deformation zone, the rib (62) abuts on the receiving portion (70).

Also, in the above-described invention, the axle (19) may be supported by the hub (23) through a bearing (43), the hub (23) may be provided with a cylindrical bearing retaining portion (40), the cylindrical bearing retaining portion (40) having an inner peripheral portion retaining the bearing (43), the receiving portion (70) may be a surface formed at an outer end of the bearing retaining portion (40) in an axial direction, the pulser ring (34) may be provided with an insertion hole (61), the insertion hole (61) allowing the axle (19) to pass through the insertion hole (61), and the rib (62) may be an annular wall portion, the annular wall portion extending in the axial direction of the axle (19) from a peripheral edge portion of the insertion hole (61).

Also, in the above-described invention, the pulser ring (34) may be provided with the detected portion (60), the detected portion (60) being formed in a position outside of the rib (62) in a radial direction, and the pulser ring (34) may be provided with a fixing portion (63), the fixing portion (63) being formed in a position outside of the detected portion (60) in the radial direction, the fixing portion (63) fixing the pulser ring (34) to the wheel (22).

Advantageous Effects of Invention

According to the pulser ring mounting structure of the present invention, the pulser ring is provided with the rib, the rib extending to be located close to the receiving portion, the receiving portion being provided with respect to the outer surface of the hub of the wheel. With this configuration, rigidity of the pulser ring can be improved by the rib. Also, when the pulser ring is deflected by external force, deformation of the pulser ring can be received by making the rib located close to the receiving portion of the outer surface of the hub abut on the receiving portion, and deformation volume of the pulser ring can be suppressed to a small amount.

Also, in the above-described invention, the rib may extend in the axial direction of the axle, and the rib may be located close to the receiving portion. With this configuration, the external force acting on the pulser ring in the axial direction of the axle can be received by the rib and the receiving portion, and deformation in the axial direction can be effectively suppressed.

Also, in the above-described invention, the receiving portion may extend in the axial direction of the axle, and the receiving portion may be located close to the rib. With this configuration, the external force acting on the pulser ring in the axial direction of the axle can be received by the rib and the receiving portion, and the deformation in the axial direction can be effectively suppressed.

Further, in the above-described invention, the hub may be provided with the cylindrical portion, the cylindrical portion covering the axle from the outer peripheral side, and the receiving portion may be the plane, the plane being formed at the end of the cylindrical portion in the axial direction of the axle. With this configuration, the rib can be effectively received by the plane, and the deformation volume of the pulser ring can be suppressed. Also, a portion between the end of the cylindrical portion and the pulser ring can be filled with the rib. For this reason, pebbles or the like can be suppressed from being moved from the inside of the cylindrical portion to the outside of the cylindrical portion.

Also, in the above-described invention, in the thickness direction of the rib, the receiving portion may be formed to have the thickness greater than the thickness of the rib. With this configuration, the whole in the thickness direction of the rib can be received by the receiving portion, and the deformation volume of the pulser ring can be suppressed.

Also, in the above-described invention, the rib may be annularly and continuously provided. With this configuration, the rigidity of the pulser ring can be improved in a balanced manner, and also when the pulser ring is deflected, the rib can efficiently abut on the receiving portion. Also, the rib has the annular shape, and the rib can be located close to the receiving portion over the entire periphery. For this reason, the pebbles or the like can be suppressed from being moved from the inner peripheral side of the rib to the outer peripheral side of the rib.

Also, in the above-described invention, the pulser ring may be mounted with respect to the wheel in order to form the gap between the rib and the receiving portion. With this configuration, by providing the gap, such deformation volume that the pulser ring can be elastically deformed can be largely ensured, and the external force acting on the pulser ring can be effectively released by the elastic deformation of the pulser ring. Further, the pulser ring can be mounted with respect to the wheel under the appropriate condition without strict dimensional control of the pulser ring and the receiving portion.

Also, in the above-described invention, the gap may be set to such a size that when the pulser ring is deformed in the elastic deformation zone, the rib abuts on the receiving portion. With this configuration, when the pulser ring is elastically deformed, the rib abuts on the receiving portion, and the pulser ring is prevented from being plastically deformed. For this reason, the pulser ring can be returned to the original normal shape when the external force is eliminated.

Further, in the above-described invention, the axle may be supported by the hub through the bearing, the hub may be provided with the cylindrical bearing retaining portion, the cylindrical bearing retaining portion having the inner peripheral portion retaining the bearing, the receiving portion may be the surface formed at the outer end of the bearing retaining portion in the axial direction, the pulser ring may be provided with the insertion hole, the insertion hole allowing the axle to pass through the insertion hole, and the rib may be the annular wall portion, the annular wall portion extending in the axial direction of the axle from the peripheral edge portion of the insertion hole. With this configuration, by a simple structure using the bearing retaining portion, and the rib extending from the insertion hole of the axle, the outer end of the cylindrical bearing retaining portion and the annular rib can be located close to each other, and the deformation of the pulser ring can be suppressed.

Also, in the above-described invention, the pulser ring may be provided with the detected portion, the detected portion being formed in the position outside of the rib in the radial direction, and the pulser ring may be provided with the fixing portion, the fixing portion being formed in the position outside of the detected portion in the radial direction, the fixing portion fixing the pulser ring to the wheel. With this configuration, a part for forming the detected portion in the pulser ring can be ensured between the fixing portion and the rib positioned close to the bearing retaining portion, and the part for forming the detected portion can be ensured largely in the radial direction of the pulser ring. For this reason, the degree of freedom in arrangement of the detected portion can be improved.

BRIEF DESCRIPTION OF DRAWINGS

FIG. 3 is a cross-sectional view taken along line III-III in FIG. 2, and FIG. 3 is a view showing a cross section of a peripheral portion of a right arm portion.

DESCRIPTION OF EMBODIMENTS

An embodiment of the present invention will be described below with reference to drawings. Note that in the explanation, description of directions such as front and rear, right and left, and upper and lower is the same direction with respect to a vehicle body unless otherwise specially described. Also, note that in each drawing, a reference sign FR is indicative of a front side of the vehicle body, a reference sign UP is indicative of an upper side of the vehicle body, and a reference sign LH is indicative of a left side of the vehicle body.

Figure 1:
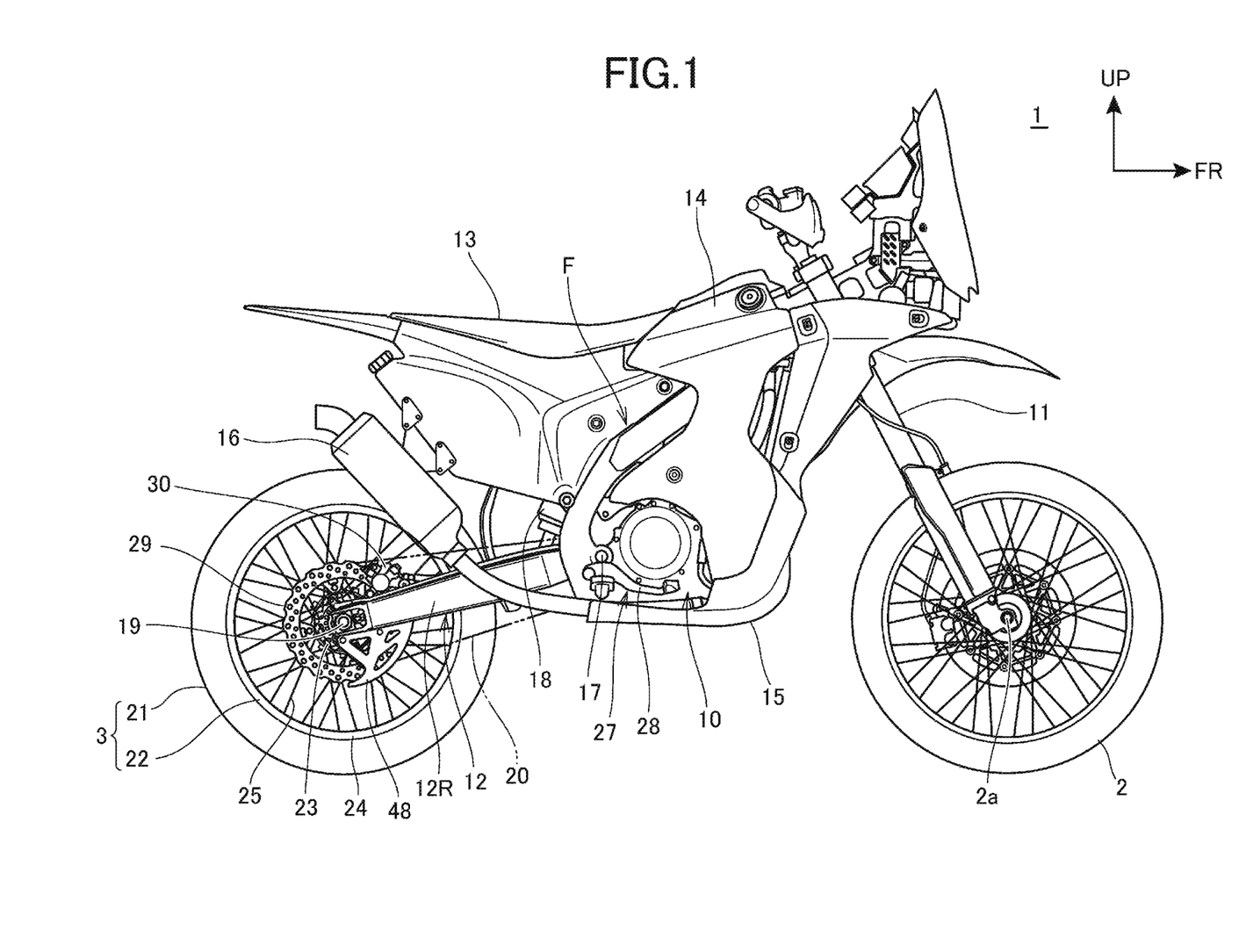
FIG. 1 is a right side view of a motorcycle according to an embodiment of the present invention.

FIG. 1 is a right side view of a motorcycle according to an embodiment of the present invention.

The motorcycle 1 is a vehicle including an engine 10, a front fork 11, and a swing arm 12. The engine 10 as a power unit is supported by a vehicle body frame F. The front fork 11 for supporting a front wheel 2 is steerably supported by a front end of the vehicle body frame F. The swing arm 12 for supporting a rear wheel 3 is provided on a rear side of the vehicle body frame F. The motorcycle 1 is a saddle riding vehicle. The saddle riding vehicle is configured in such a manner that a seat 13 for allowing a rider to be seated on the seat 13 in a striding manner is provided above a rear portion of the vehicle body frame F. The motorcycle 1 is an all terrain vehicle having high travelling performance on an uneven terrain (off-road).

The front wheel 2 is journaled to a front wheel axle 2a at a lower end of the front fork 11.

A fuel tank 14 is supported by the vehicle body frame F above the engine 10. An exhaust pipe 15 of the engine 10 is pulled out of a front portion of the engine 10, the exhaust pipe 15 extends rearward, and the exhaust pipe 15 is connected to a muffler 16 located outside of the rear wheel 3.

The motorcycle 1 is provided with a pivot shaft 17. The pivot shaft 17 extends in a vehicle width direction, and the pivot shaft 17 is provided below the rear portion of the vehicle body frame F.

The swing arm 12 has a front end journaled to the pivot shaft 17, and the swing arm 12 is swingable around the pivot shaft 17. A rear suspension 18 is laid between the swing arm 12 and the vehicle body frame F.

The swing arm 12 is provided with a pair of right and left arm portions 12R, 12L (the left arm portion 12L is not shown in the drawing), and a cross member (not shown in the drawing). The pair of right and left arm portions 12R, 12L extends rearward from the pivot shaft 17. The cross member connects front portions of the arm portions 12L, 12R to each other in the vehicle width direction.

The rear wheel 3 is arranged between the right and left arm portions 12R, 12L, and the rear wheel 3 is journaled to a rear wheel axle 19 (axle). The rear wheel axle 19 connects rear ends of the arm portions 12L, 12R.

Power of the engine 10 is transmitted to the rear wheel 3 by a drive chain 20 wound between a drive sprocket (not shown in the drawing) and a driven sprocket (not shown in the drawing) of the rear wheel 3. The drive sprocket is provided to an output shaft of the engine 10.

Figure 2:
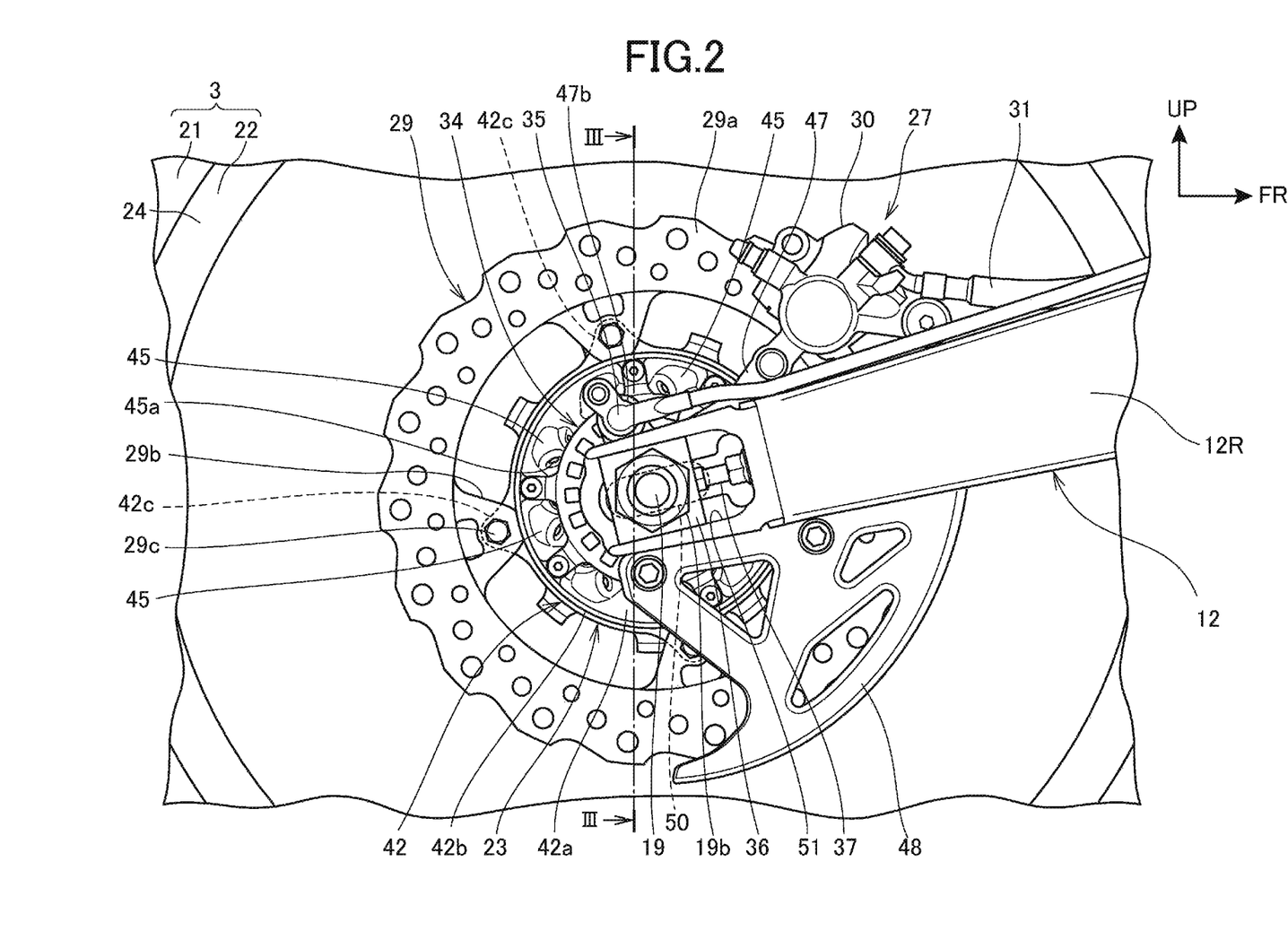
FIG. 2 is a right side view of a peripheral portion of a rear wheel.

FIG. 2 is a right side view of a peripheral portion of the rear wheel 3.

As shown in FIG. 1 and FIG. 2, the rear wheel 3 is provided with a tire 21 and a wheel 22 mounted with the tire 21.

The wheel 22 is provided with a hub 23, an annular rim 24, and a spoke 25 (not shown in FIG. 2). The hub 23 is journaled to the rear wheel axle 19. The annular rim 24 has an outer peripheral portion mounted with the tire 21. The spoke 25 couples the hub 23 and the rim 24 together. The spoke 25 is configured with a plurality of wire spokes extending substantially radially from the hub 23 to the rim 24.

The motorcycle 1 includes a hydraulic rear wheel brake device 27 for braking the rear wheel 3. The rear wheel brake device 27 is provided with a brake pedal 28, a brake disc 29, a caliper 30, and a brake hose 31. The brake pedal 28 is manipulated by the rider. The brake disc 29 is fixed to the hub 23. The caliper 30 performs braking across the brake disc 29. The brake hose 31 transmits hydraulic pressure produced by manipulation of the brake pedal 28 to the caliper 30.

Also, the motorcycle 1 includes a wheel speed detector for detecting rotational speed of the rear wheel 3. The wheel speed detector is configured with a pulser ring 34 fixed to the hub 23, and a wheel speed sensor 35 for detecting rotation of the pulser ring 34. The wheel speed sensor 35 is connected to an ECU (control section) for controlling each part such as the engine 10 of the motorcycle 1.

The swing arm 12 is provided with an adjusting mechanism for adjusting tension of the drive chain 20. The adjusting mechanism is provided with a square sliding member 36 and a positioning member 37. The square sliding member 36 allows insertion of the rear wheel axle 19 into the square sliding member 36. The positioning member 37 regulates a position of the sliding member 36. The adjusting mechanism is provided to each of the right and left arm portions 12R, 12L.

Figure 3:
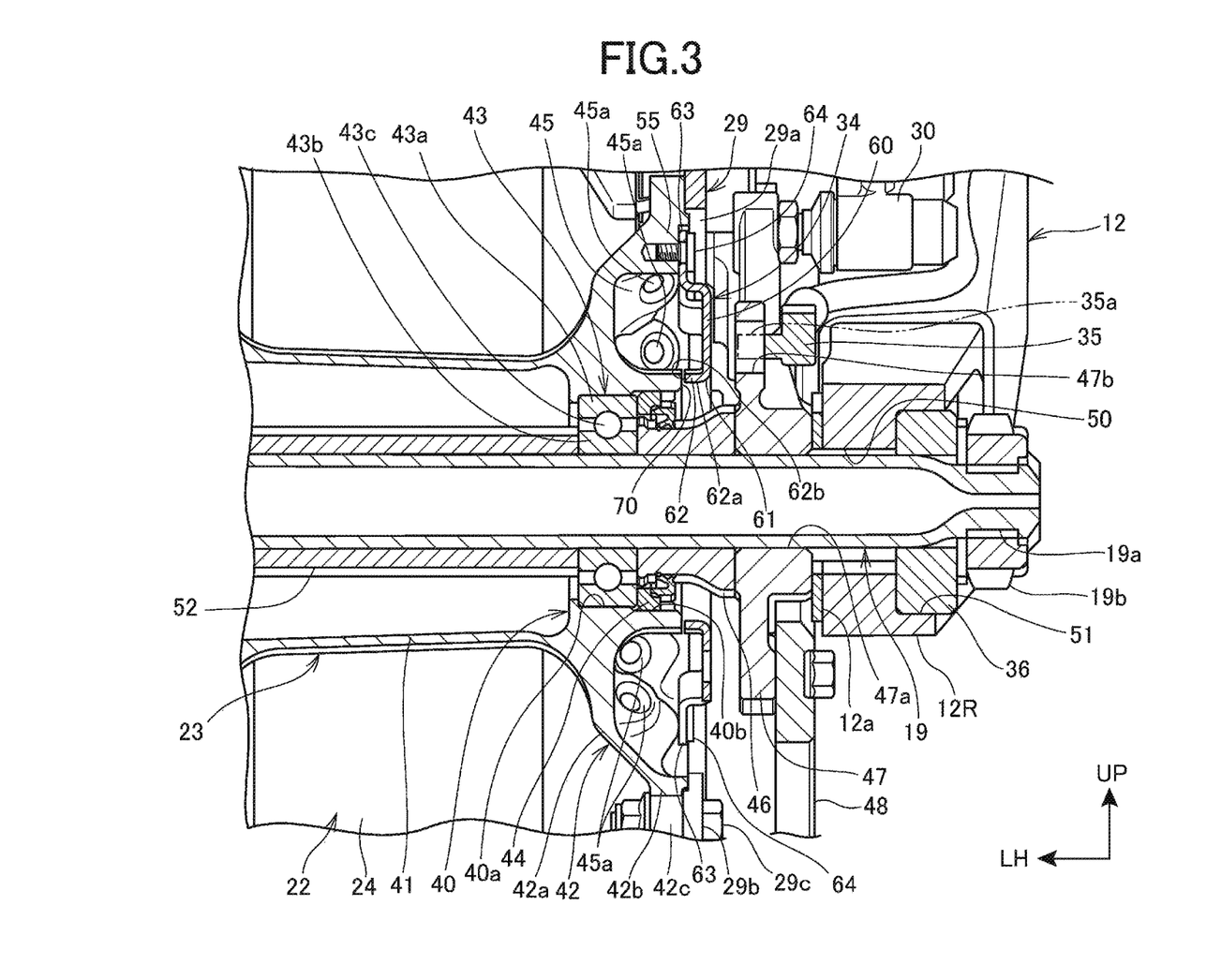

FIG. 3 is a cross-sectional view taken along line III-III in FIG. 2, and FIG. 3 shows a cross section of a peripheral portion of the right arm portion 12R. Note that in FIG. 3, the spoke 25 is not shown.

With reference to FIG. 2 and FIG. 3, the hub 23 is provided with bearing retaining portions 40 (a left bearing retaining portion is not shown in the drawing), a coupling cylindrical portion 41, and extension portions 42. The bearing retaining portions 40 as cylindrical portions are respectively provided at both ends in the axial direction of the hub 23 (ends in a horizontal direction). The coupling cylindrical portion 41 couples the right and left bearing retaining portion 40 together in the vehicle width direction. The extension portions 42 having a disc shape in a side view extend outward in the radial direction from the bearing retaining portions 40.

Each of the bearing retaining portions 40 is provided with a bearing storage portion 40a, and a seal member storage portion 40b. The bearing storage portion 40a stores a bearing 43. The seal member storage portion 40b is provided outside in the vehicle width direction of the bearing storage portion 40a.

The bearing 43 is a ball bearing. The ball bearing is provided with an outer ring 43a, an inner ring 43b, and a ball 43c. The outer ring 43a is fitted to an inner peripheral portion of the bearing storage portion 40a. The inner ring 43b is fitted to an outer peripheral portion of the rear wheel axle 19. The ball 43c is provided between the outer ring 43a and the inner ring 43b.

An annular seal member 44 is fitted to the inner peripheral portion of the seal member storage portion 40b.

The extension portion 42 of the hub 23 is provided with a flanged side wall portion 42a, and an outside cylindrical portion 42b. The flanged side wall portion 42a extends outward in the radial direction from the outer peripheral portion of the bearing storage portion 40a. The outside cylindrical portion 42b extends outward in the vehicle width direction from an outer end in the radial direction of the side wall portion 42a, and the outside cylindrical portion 42b is formed into a cylindrical shape.

Also, the hub 23 is provided with spoke coupling portions 45. The spoke coupling portions 45 are bulged outward in the vehicle width direction from the side wall portion 42a. The spoke coupling portions 45 are formed to extend over the side wall portion 42a and the outside cylindrical portion 42b, and also a plurality of spoke coupling portions 45 are formed at substantially regular intervals in the peripheral direction of the hub 23.

The spoke coupling portions 45 are formed with spoke hole portions 45a configured in such a manner that wire spokes of the spoke 25 are fixed in the spoke hole portions 45a. Detailedly, each of the wire spokes of the spoke 25 is inserted into the spoke hole portion 45a from a side of the inner peripheral surface of the outside cylindrical portion 42b, and a flange portion formed at one end of each of the wire spokes is brought into close contact with a peripheral edge portion of each of the spoke hole portions 45a. Each of the wire spokes of the spoke 25 extends outward in the radial direction of the hub 23 from each of the spoke hole portions 45a toward the center in a width direction of the rim 24. The other end of each of the wire spokes is coupled to the center of the rim 24.

Also, the hub 23 is provided with stay portions 42c. The stay portions 42c protrude outward in the radical direction from the outer peripheral portion of the outside cylindrical portion 42b. A plurality of stay portions 42c are formed at substantially regular intervals in the peripheral direction of the outside cylindrical portion 42b.

A cylindrical collar 46, a retaining member 47, and a plate member 12a are interposed between the hub 23 and the right arm portion 12R. The cylindrical collar 46 is provided to allow the rear wheel axle 19 to be inserted into the cylindrical collar 46. The retaining member 47 supports the caliper 30. The plate member 12a is provided integrally with an inside surface of the arm portion 12R.

The collar 46 has an outer peripheral portion at an inner end in the axial direction. The outer peripheral portion is fitted to the inner peripheral portion of the seal member 44. Also, the collar 46 has an end surface of the inner end. The end surface of the inner end abuts on each of the inner rings 43b of each of the bearings 43.

The retaining member 47 is formed with a though hole 47a. The rear wheel axle 19 is inserted into the through hole 47a. Also, the retaining member 47 is sandwiched between the outer end of the collar 46 in the axial direction and the plate member 12a. The caliper 30 is fixed to a front end of the retaining member 47. Also, a disc cover 48 for covering a lower portion of the brake disc 29 from a lateral side and a front side is fixed to a lower portion of the retaining member 47.

The retaining member 47 has a sensor insertion hole 47b. The sensor insertion hole 47b penetrates in the vehicle width direction, and the sensor insertion hole 47b is formed in a position overlapping with the pulser ring 34 in the side view.

The wheel speed sensor 35 is mounted with respect to an outside surface of the retaining member 47. The wheel speed sensor 35 is arranged above the rear wheel axle 19 and behind the caliper 30, and in the side view, the wheel speed sensor 35 is positioned on a side closer to the rear wheel axle 19 than the outside cylindrical portion 42b of the hub 23. A detection portion 35a of the wheel speed sensor 35 is inserted into the sensor insertion hole 47b, and the detection portion 35a is located close to the pulser ring 34.

A rear end of each of the arm portions 12R, 12L (the left arm portion 12L is not shown in the drawing) is formed with an axle insertion hole 50 and a retaining groove 51. The axle insertion hole 50 allows the rear wheel axle 19 to be inserted into the axle insertion hole 50. The retaining groove 51 is formed in an outside surface. The axle insertion hole 50 is formed into a shape of an oblong hole long in a longitudinal direction, and the axle insertion hole 50 penetrates through the retaining groove 51 in the vehicle width direction. In the retaining groove 51, the sliding member 36 is retained slidably in the longitudinal direction. The positioning member 37 extending rearward is provided at a front end of the retaining groove 51. The front end of the sliding member 36 abuts on a rear surface of the positioning member 37.

The positioning member 37 is a bolt fastened to the front end of the retaining groove 51. By adjusting a fastening rate of the positioning member 37, a position of the rear wheel axle 19 in the longitudinal direction can be changed through the right and left sliding members 36. Herewith, tension of the drive chain 20 can be adjusted.

Figure 4:
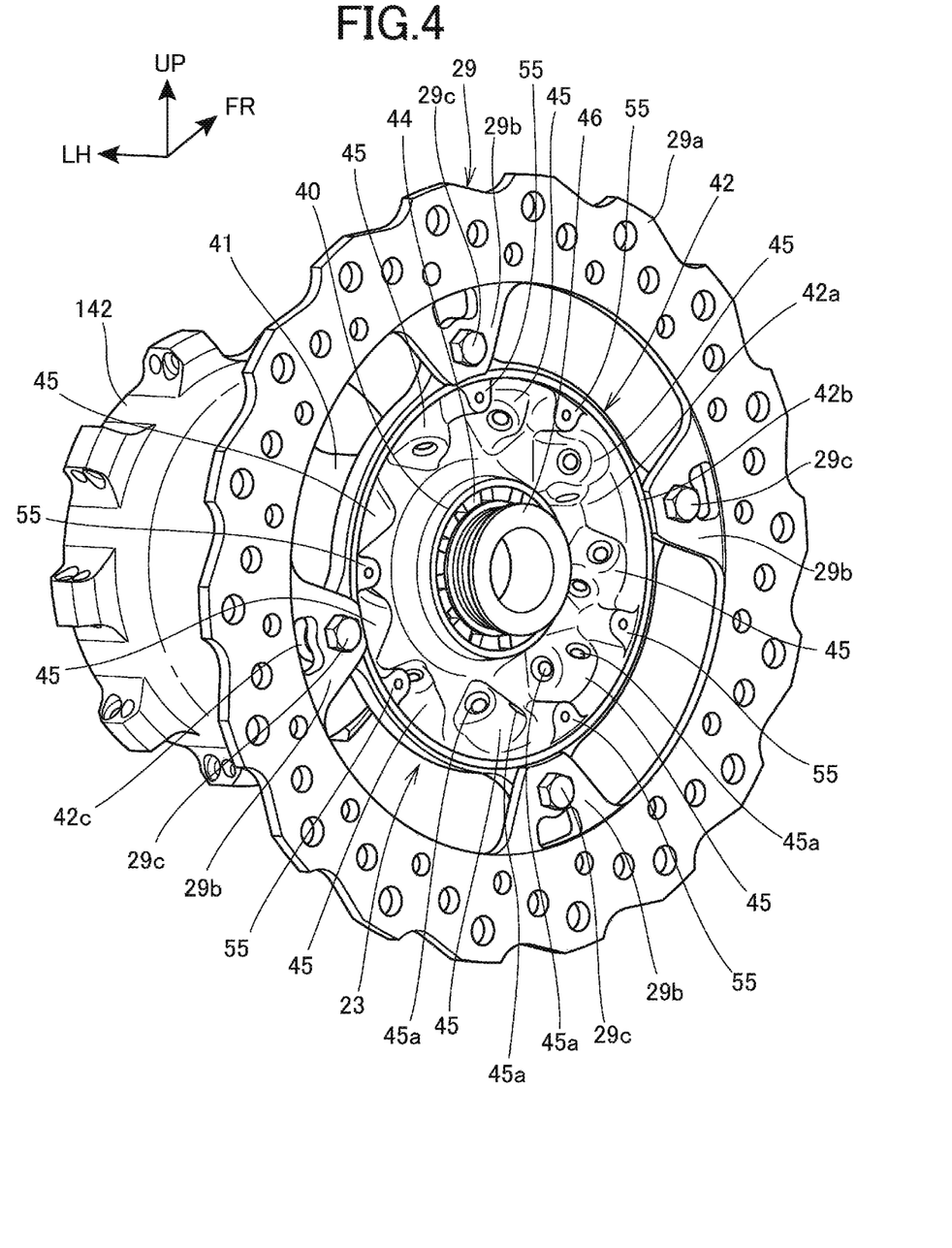
FIG. 4 is a perspective view of a hub mounted with a brake disc.

FIG. 4 is a perspective view of the hub 23 mounted with the brake disc 29. In FIG. 4, the pulser ring 34 is not shown.

With reference to FIG. 3 and FIG. 4, substantially the same extension portion 142 as the extension portion 42 at the right end is provided at the left end of the hub 23. The same bearing retaining portion (not shown in the drawing) as the bearing retaining portion 40 is formed in the center of the extension portion 142. The bearing retaining portion 40 is formed with the same bearings 43 and the seal members 44 as those in FIG. 3. The collar 46 is fitted to the seal member 44.

A sleeve 52 is provided in the coupling cylindrical portion 41 of the hub 23. The sleeve 52 allows the rear wheel axle 19 to be inserted into the sleeve 52. The sleeve 52 is interposed between the inner ring 43b of the right bearing 43 and the inner ring (not shown in the drawing) of the left bearing.

The above-described driven sprocket (not shown in the drawing) wound with the drive chain 20 is fixed to the outside surface of the extension portion 142.

The rear wheel axle 19 is formed into a bolt shape. The rear wheel axle 19 is inserted from the sliding member 36 of the left arm portion 12L (not shown in the drawing), and the rear wheel axle 19 is passed through the hub 23. The rear wheel axle 19 has a screw portion 19a formed at a tip end. The screw portion 19a protrudes lateral to the right arm portion 12R. A nut 19b is tightened around the screw portion 19a.

The wheel 22 is rotatably mounted on the rear wheel axle 19 by sandwiching the right and left inner rings 43b between the right and left collar 46 by tightening axial force of the rear wheel axle 19.

Figure 5:
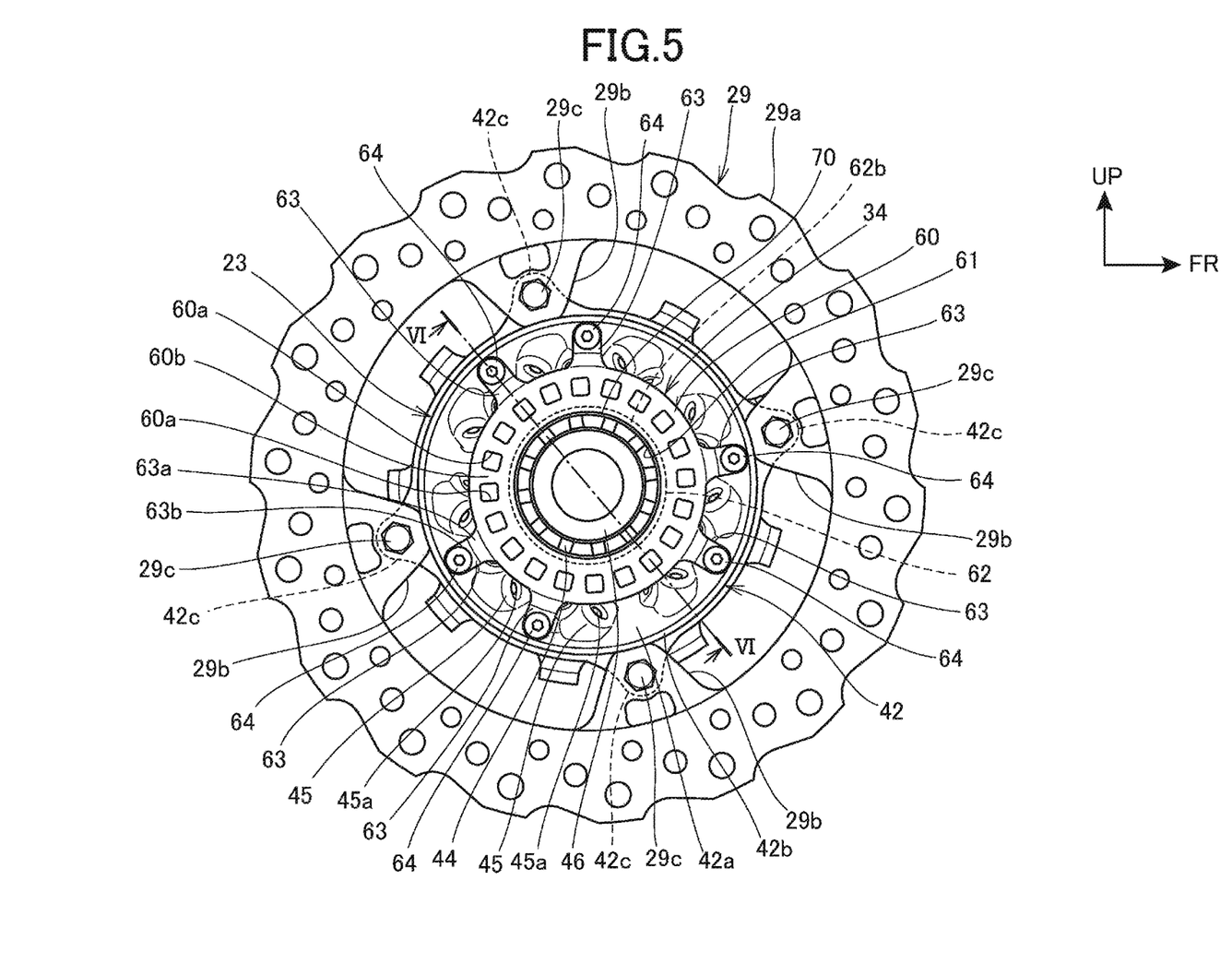
FIG. 5 is a right side view of the hub mounted with the brake disc and a pulser ring.

FIG. 5 is a right side view of the hub 23 mounted with the brake disc 29 and the pulser ring 34.

With reference to FIG. 2 to FIG. 5, the brake disc 29 is provided in a position outside in the radial direction of the hub 23 in a positional relation ship coaxially with the rear wheel axle 19, and also the brake disc 29 is fixed to the hub 23.

The brake disc 29 is provided with an annular disc portion 29a and fixing pieces 29b. The annular disc portion 29a is held by the caliper 30. The fixing pieces 29b protrude inward in the radial direction from the inner peripheral portion of the disc portion 29a toward a side of the hub 23.

The disc portion 29a is formed larger in diameter than an outer diameter of the outside cylindrical portion 42b of the hub 23. A plurality of fixing pieces 29b are formed at substantially regular intervals in the peripheral direction of the brake disc 29.

In the brake disc 29, the fixing pieces 29b are arranged to overlap with the stay portions 42c of the hub 23 from an outside in the vehicle width direction, and the fixing pieces 29b are fastened to the stay portions 42c by disc fixing bolts 29c. The disc fixing bolts 29c are inserted into the fixing pieces 29b from the outside in the vehicle width direction.

With reference to FIG. 2 to FIG. 5, the extension portion 42 of the hub 23 is formed with pulser ring fixing portions 55. The pulser ring fixing portions 55 are configured to be mounted with the pulser ring 34.

The pulser ring fixing portion 55 are cylindrical boss portions. The cylindrical boss portions are formed to protrude outward in the vehicle width direction from the side wall portion 42a of the extension portion 42. In the radial direction of the hub 23, the pulser ring fixing portions 55 are formed between the outside cylindrical portion 42b and the bearing retaining portion 40.

Additionally, the pulser ring fixing portions 55 are formed integrally also with respect to the inner peripheral portion of the outside cylindrical portion 42b. A plurality of pulser ring fixing portions 55 are provided at intervals in the peripheral direction of the hub 23.

In the radial direction of the hub 23, the respective pulser ring fixing portion 55 are provided outside of the spoke hole portions 45a and inside of the outside cylindrical portion 42b.

Figure 6:
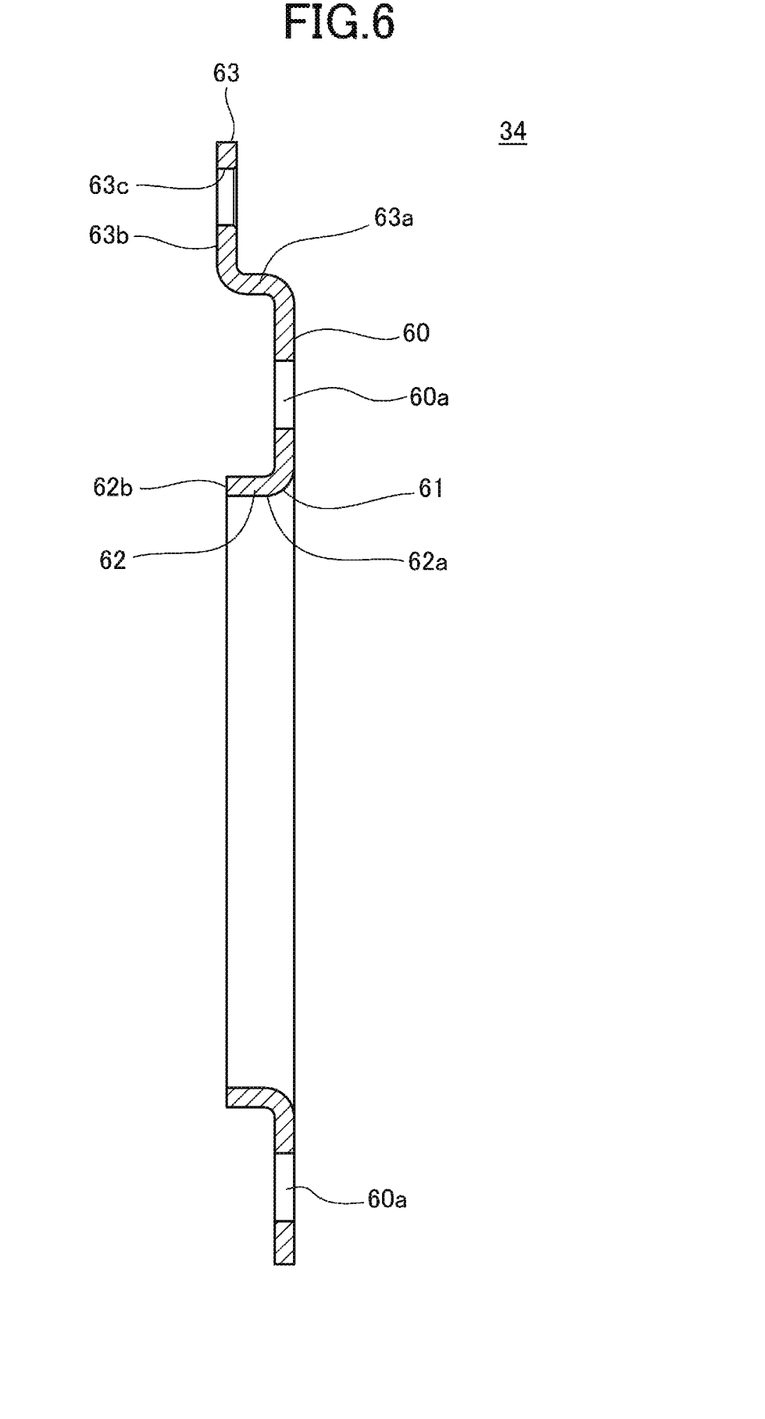
FIG. 6 is a cross-sectional view taken along line VI-VI of the pulser ring in FIG. 5.
Figure 7:
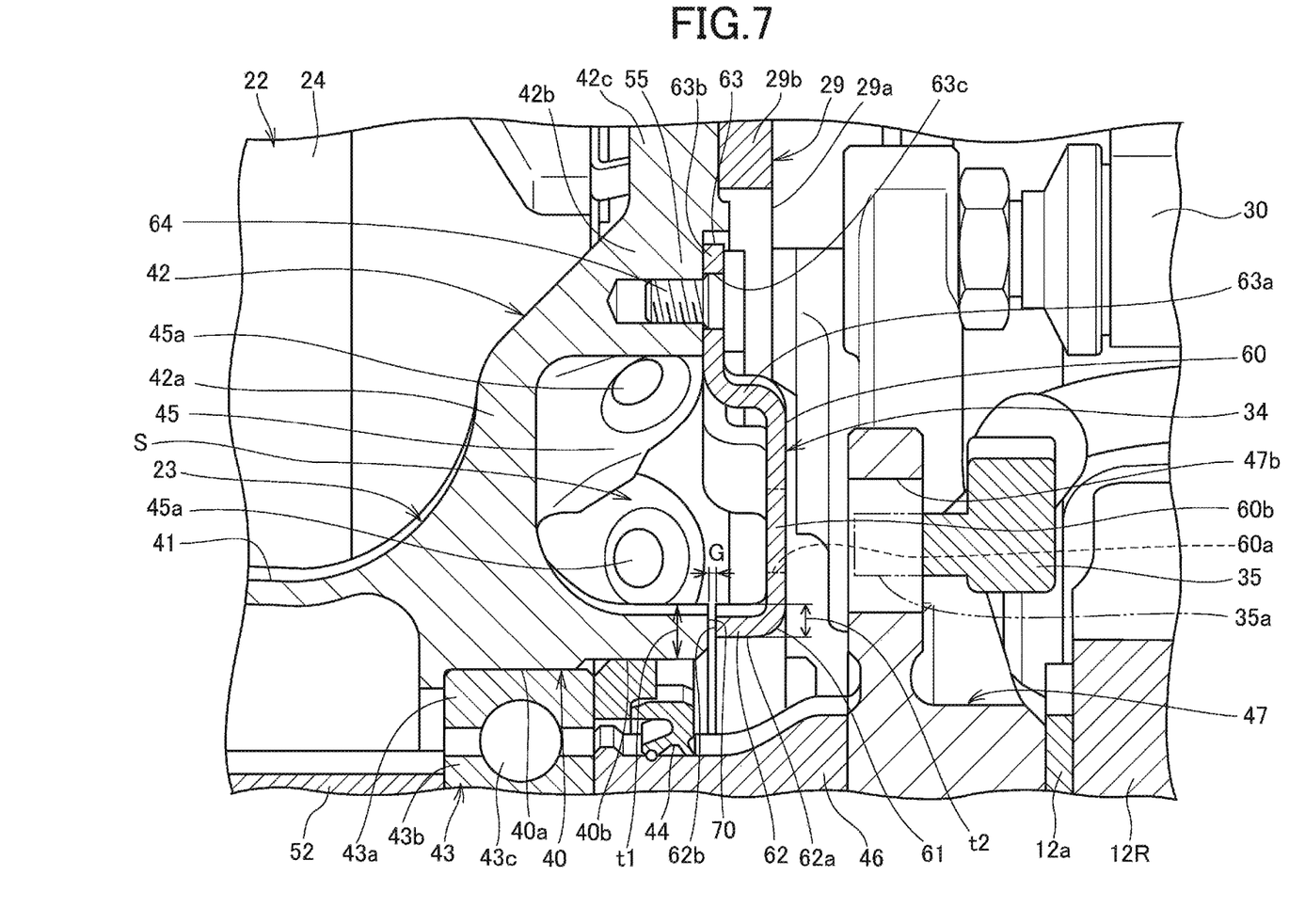
FIG. 7 is a cross-sectional view showing a peripheral portion of the pulser ring and a wheel speed sensor in FIG. 3.

FIG. 6 is a cross-sectional view taken along line VI-VI of the pulser ring 34 in FIG. 5. FIG. 7 is a cross-sectional view showing a peripheral portion of the pulser ring 34 and the wheel speed sensor 35 in FIG. 3.

With reference to FIG. 2 to FIG. 7, the pulser ring 34 is provided with an annular detected portion 60, an insertion hole 61, an annular rib 62, and mounting pieces 63 (fixing portion). The annular detected portion 60 is arranged coaxially with the rear wheel axle 19. The insertion hole 61 allows the rear wheel axle 19 to pass through the insertion hole 61. The annular rib 62 extends inward in the vehicle width direction from the inner peripheral portion of the insertion hole 61 to the axial direction of the rear wheel axle 19. The mounting pieces 63 extend outward in the radial direction from the outer peripheral portion of the detected portion 60.

The pulser ring 34 is manufactured by pressingly molding, for example, a metal plate, and the pulser ring 34 is formed integrally with the detected portion 60, the rib 62, and the mounting pieces 63.

The pulser ring 34 is mounted with respect to the outside surface of the hub 23. The pulser ring 34 is arranged coaxially with the brake disc 29 and the rear wheel axle 19. Also, the pulser ring 34 is arranged inside in the radial direction in comparison with the inner peripheral portion of the disc portion 29a, and the pulser ring 34 is provided inside of the outside cylindrical portion 42b of the hub 23.

Also, in the axial direction of the rear wheel axle 19, the pulser ring 34 is arranged between the hub 23 and the retaining member 47, and the pulser ring 34 is provided to surround the collar 46 from the outer peripheral side.

The detected portion 60 is a ring-shaped circular plate arranged substantially parallel to the brake disc 29, and the detected portion 60 is provided with a plurality of detecting holes 60a. The detecting holes 60a penetrate through the circular plate in a plate thickness direction. The plurality of detecting holes 60a are formed at equal intervals in the peripheral direction of the pulser ring 34 in order to be juxtaposed in an annular shape. Partitioning portions 60b for partitioning the detecting holes 60a, 60a are formed between the adjacent detecting holes 60a, 60a. In the radial direction of the hub 23, the detecting holes 60a and the partitioning portions 60b are arranged between the bearing retaining portions 40 and the outside cylindrical portion 42b.

The wheel speed sensor 35 is arranged in such a manner that the detection portion 35a is located close to the detecting holes 60a and the partitioning portions 60b from the outside in the vehicle width direction. By detecting the detected portion 60 rotating integrally with the wheel 22, the rotational speed (wheel speed) of the wheel 22 is detected.

Detailedly, the wheel speed sensor 35 outputs a change in a magnetic flux as a pulse wave according to the rotational speed of the wheel 22 to the ECU. The magnetic flux is generated when the detecting holes 60a and the partitioning portions 60b are passed through the vicinity of the detection portion 35a in association with rotation of the wheel 22

A plurality of mounting pieces 63 of the pulser ring 34 are arranged at intervals in the peripheral direction of the pulser ring 34. The mounting pieces 63 are provided with axial extension portions 63a and abutting portions 63b. The axial extension portions 63a extend inward in the vehicle width direction from the outer peripheral portion of the detected portion 60 to a side of the hub 23. The abutting portions 63b extend outward in the radial direction of the pulser ring 34 from ends of the axial extension portions 63a.

The abutting portions 63b of the mounting pieces 63 abut on the end surfaces of the pulser ring fixing portions 55 of the hub 23 from the outside in the vehicle width direction. The abutting portions 63b are formed with holes 63c.

The pulser ring 34 is fastened to the pulser ring fixing portions 55 by pulser ring fixing bolts 64. The pulser ring fixing bolts 64 are inserted into the holes 63c of the abutting portions 63b from the outside in the vehicle width direction.

The insertion hole 61 in the center of the pulser ring 34 is a circular inner peripheral portion of the ring-shaped detected portion 60, and the insertion hole 61 is formed larger in diameter than the outer diameter of the collar 46.

The rib 62 is a wall portion. The wall portion is disposed upright from the whole circumference of the peripheral edge portion of the insertion hole 61 toward the hub 23. The rib 62 has a cylindrical shape formed annularly and continuously in order to surround the collar 46 and the rear wheel axle 19 from the periphery.

The pulser ring 34 is fixed to the hub 23 so that the annular rib 62 is positioned coaxially with the rear wheel axle 19 and the bearing retaining portions 40, and the rear wheel axle 19 and the collar 46 are passed through an inner peripheral portion 62a of the rib 62.

In the present embodiment, the pulser ring 34 is provided in such a manner that when the pulser ring 34 is deformed by the external force or the like, the rib 62 of the pulser ring 34 abuts on the outer surface of the hub 23, so that the deformation of the pulser ring 34 is suppressed.

Detailedly, as shown in FIG. 7, the rib 62 is provided with an abutting surface 62b at an end surface inside in the vehicle width direction. The abutting surface 62b is located axially close to the end surface of the cylindrical bearing retaining portion 40 of the hub 23. The abutting surface 62b is formed into a planar shape perpendicular to the rear wheel axle 19 over the entire peripheral direction of the rib 62.

The bearing retaining portion 40 is provided with a receiving portion 70 on an end surface outside in the vehicle width direction. The receiving portion 70 is opposed to the abutting surface 62b of the rib 62. The receiving portion 70 is formed into a planar shape substantially parallel to the abutting surface 62b over the entire peripheral direction of the bearing retaining portion 40. The abutting surface 62b and the receiving portion 70 are arranged in a coaxial positional relationship.

With reference to FIG. 5 and FIG. 7, the rib 62 is provided in such a manner that when the rib 62 is viewed in the axial direction of the rear wheel axle 19, at least a part of the abutting surface 62b overlaps with the receiving portion 70 of the hub 23.

Detailedly, the outer diameter of the abutting surface 62b is substantially the same as the outer diameter of the receiving portion 70. Also, the thickness t1 in the radial direction of the receiving portion 70 is formed to have the thickness greater than the thickness t2 in the radial direction of the abutting surface 62b of the rib 62. The inner diameter of the receiving portion 70 is smaller than the inner diameter of the abutting surface 62b. That is, in the present embodiment, when the rib 62 is viewed in the axial direction of the rear wheel axle 19, the whole rib 62 overlaps with the receiving portion 70.

The pulser ring 34 is fixed to the hub 23 in order to form a gap G between the abutting surface 62b and the receiving portion 70 of the hub 23. The gap G is a gap configured to separate the abutting surface 62b and the receiving portion 70 from each other in the axial direction of the rear wheel axle 19, and the gap G is set to substantially the same size over the whole in the peripheral direction of the abutting surface 62b.

Detailedly, the gap G is set to a predetermined size so that when the pulser ring 34 is deformed by action of the external force from the radial direction or the axial direction (vehicle width direction) of the rear wheel axle 19 on the pulser ring 34, the abutting surface 62b abuts on the receiving portion 70 by the deformation volume within the elastic deformation zone at a stage prior to the plastic deformation of the pulser ring 34. For example, the gap G is set to about 1 (mm).

For this reason, even if the pulser ring 34 is deflected by the action of the external force on the pulser ring 34 by flying stones or the like during traveling or by the action of the external force on the pulser ring 34 by a tool or the like during maintenance work, the abutting surface 62b abuts on the receiving portion 70 by the deformation volume within the elastic deformation zone. As a result, the pulser ring 34 is prevented from being plastically deformed. By providing the gap G, such deformation volume that the pulser ring 34 can be elastically deformed can be largely ensured. For this reason, the external force acting on the pulser ring 34 can be effectively released by the elastic deformation of the pulser ring 34, and the pulser ring 34 can be prevented from being elastically deformed.

When the above-described external force is eliminated, the pulser ring 34 is returned to the original shape by restoring force of the elastic deformation.

Also, since the comparatively large gap G is set, even if the dimensional accuracy of the pulser ring 34 is not tightened, abutment of a part of the abutting surface 62b on the receiving portion 70, caused by vibration or the like during normal traveling, can be prevented. For this reason, the pulser ring 34 can be easily manufactured, and also noise generation caused by abutment of the abutting surface 62b on the receiving portion 70 can be prevented.

Also, since the abutting surface 62b and the receiving portion 70 are planes opposed to each other, the deformation of the pulser ring 34 can be effectively received by the receiving portion 70. For this reason, the pulser ring 34 can be prevented from being deformed.

Further, since the thickness of the receiving portion 70 is larger than the thickness of the abutting surface 62b in the radial direction, the abutting surface 62b of the rib 62 can entirely abut on the receiving portion 70. For this reason, the pulser ring 34 can be effectively prevented from being deformed.

Also, a space S between the bearing retaining portion 40 and the outside cylindrical portion 42b of the hub 23 is partitioned with respect to a space between the collar 46 and the bearing retaining portion 40 by the rib 62 and the detected portion 60 of the pulser ring 34. For this reason, foreign matter such as pebbles is prevented from intruding into the space S from the space around the collar 46.

Also, since the mounting pieces 63 of the pulser ring 34 are provided with the axial extension portions 63a and the abutting portions 63b, and the mounting pieces 63 extends in the radial direction and the axial direction of the pulser ring 34, the mounting pieces 63 can be largely elastically deformed while being entirely bent. For this reason, such deformation volume that the pulser ring 34 can be elastically deformed can be largely ensured.

As has been described above, according to the embodiment applied with the present invention, the mounting structure for the pulser ring 34 includes the wheel 22 provided with the hub 23 journaled to the rear wheel axle 19, and the pulser ring 34 mounted with respect to the wheel 22 and provided with the annular detected portion 60 detected by the wheel speed sensor 35. The pulser ring 34 is provided with the rib 62 extending to be located close to the receiving portion 70 provided with respect to the outer surface of the hub 23. For this reason, the rigidity of the pulser ring 34 can be improved by the rib 62. Also, when the pulser ring 34 is deflected by the external force, the deformation of the pulser ring 34 can be received by making the rib 62 located close to the receiving portion 70 of the outer surface of the hub 23 abut on the receiving portion 70. As a result, the deformation volume of the pulser ring 34 can be suppressed to a small amount.

Also, since the rib 62 extends in the axial direction of the rear wheel axle 19, and the rib 62 is located close to the receiving portion 70, the external force acting on the pulser ring 34 in the axial direction of the rear wheel axle 19 can be received by the rib 62 and the receiving portion 70. As a result, the deformation in the axial direction can be effectively suppressed.

Also, since the receiving portion 70 extends in the axial direction of the rear wheel axle 19, and the receiving portion 70 is located close to the rib 62, the external force acting on the pulser ring 34 in the axial direction of the rear wheel axle 19 can be received by the rib 62 and the receiving portion 70. As a result, the deformation in the axial direction can be effectively suppressed.

Further, since the hub 23 is provided with the bearing retaining portion 40 as the cylindrical portion for covering the rear wheel axle 19 from the outer peripheral side, and the receiving portion 70 is the plane formed at the end of the bearing retaining portion 40 in the axial direction of the rear wheel axle 19, the rib 62 can be effectively received by the plane. As a result, the deformation volume of the pulser ring 34 can be suppressed. Also, since the part between the end of the bearing retaining portion 40 and the pulser ring 34 can be filled with the rib 62. For this reason, the pebbles or the like can be suppressed from being moved from the inside of the bearing retaining portion 40 to the outside of the bearing retaining portion 40.

Also, since in the direction of the thickness t2 of the rib 62, the receiving portion 70 is formed to have the thickness t1 greater than the thickness t2, the whole portion in the direction of the thickness t2 of the rib 62 can be received by the receiving portion 70. For this reason, the deformation volume of the pulser ring 34 can be suppressed.

Also, since the rib 62 is annularly and continuously provided, the rigidity of the pulser ring 34 can be improved in a balanced manner, and also when the pulser ring 34 is deflected, the rib 62 can efficiently abut on the receiving portion 70. Also, since the rib 62 is the annular shape, and the rib 62 can be located close to the receiving portion 70 over the whole periphery of the rib 62, the pebbles or the like can be suppressed from being moved from the inner peripheral side of the rib 62 to the outer peripheral side of the rib 62.

Also, since the pulser ring 34 is mounted with respect to the wheel 22 in order to form the gap G between the rib 62 and the receiving portion 70, such deformation volume that the pulser ring 34 can be elastically deformed can be largely ensured, and the external force acting on the pulser ring 34 can be effectively released by the elastic deformation of the pulser ring 34. Further, the pulser ring 34 can be mounted with respect to the wheel 22 under the appropriate condition without the strict dimensional control of the pulser ring 34 and the receiving portion 70.

Further, the gap G is set to such s size that when the pulser ring 34 is deformed in the elastic deformation zone, the rib 62 abuts on the receiving portion 70. With this configuration, when the pulser ring 34 is elastically deformed, the rib 62 abuts on the receiving portion 70, and the pulser ring 34 is prevented from being plastically deformed. For this reason, the pulser ring 34 can be returned to the original normal shape when the external force is eliminated.

Also, the rear wheel axle 19 is supported by the hub 23 through the bearing 43. The hub 23 is provided with the cylindrical bearing retaining portion 40 having the inner peripheral portion retaining the bearing 43. The receiving portion 70 is the surface formed at the outer end of the bearing retaining portion 40 in the axial direction. The pulser ring 34 is provided with the insertion hole 61 allowing the rear wheel axle 19 to pass through the insertion hole 61. The rib 62 is the annular wall portion extending in the axial direction of the rear wheel axle 19 from the peripheral edge portion of the insertion hole 61. With this configuration, by the simple structure using the bearing retaining portion 40, and the rib 62 extending from the insertion hole 61, the outer end of the cylindrical bearing retaining portion 40 and the annular rib 62 can be located close to each other, and the deformation of the pulser ring 34 can be suppressed.

Also, the pulser ring 34 is provided with the detected portion 60 formed in the position outside of the rib 62 in the radial direction, and the pulser ring 34 is provided with the mounting piece 63 formed in the position outside of the detected portion 60 in the radial direction, the mounting piece 63 fixing the pulser ring 34 to the wheel 22. With this configuration, the part for forming the detected portion 60 in the pulser ring 34 can be ensured between the mounting piece 63 and the rib 62 positioned close to the bearing retaining portion 40, and the part for forming the detected portion 60 can be ensured largely in the radial direction of the pulser ring 34. For this reason, the degree of freedom in arrangement of the detected portion 60 can be improved. Also, since the detected portion 60 extends in the radial direction to the vicinity of the receiving portion 70, the wheel speed sensor 35 can be arranged in the position close to the rear wheel axle 19. For this reason, the wheel speed sensor 35 can be arranged in a compact manner.

Note that the above-described embodiment shows one embodiment applied with the present invention. The present invention is not limited to the above-described embodiment.

In the above-described embodiment, the configuration of the rib 62 is explained such that when the rib 62 is viewed in the axial direction of the rear wheel axle 19, the whole of the rib 62 overlaps with the receiving portion 70; however, the present invention is not limited to this. The rib 62 has only to overlap at least partially with the receiving portion 70 when viewed in the axial direction.

Also, in the above-described embodiment, the configuration of the rib 62 is explained such that the rib 62 is formed into the annular shape in order to surround the collar 46 from the periphery; however, the present invention is not limited to this. For example, the rib may be a protrusion protruding from a part of the inner peripheral portion of the insertion hole 61 to the side of the hub 23.

Also, in the above-described embodiment, the pulser ring 34 mounted with respect to the wheel 22 of the rear wheel 3 is exemplarily described; however, the present invention may be applied to a pulser ring mounting structure provided to the wheel of the front wheel 2.

Also, in the above-described embodiment, the motorcycle 1 is exemplarily described; however, the present invention is not limited to this. The present invention can be applied to three-wheeled saddle riding vehicles including two front wheels or two rear wheels, saddle riding vehicles including four wheels or more, and saddle riding vehicles such as scooters.

REFERENCE SIGNS LIST

19 . . . Rear wheel axle (axle)
22 . . . Wheel
23 . . . Hub
34 . . . Pulser ring
35 . . . Wheel speed sensor
40 . . . Bearing retaining portion (cylindrical portion)
43 . . . Bearing
60 . . . Detected portion
61 . . . Insertion hole
62 . . . Rib
63 . . . Mounting piece (fixing portion)
70 . . . Receiving portion
G . . . Gap
t2 . . . Thickness (thickness of rib)

The invention claimed is:

1. A pulser ring mounting structure comprising:
a wheel provided with a hub, the hub being journaled to an axle; and
a pulser ring, the pulser ring being mounted with respect to the wheel, the pulser ring being provided with an annular detected portion configured to be detected by a wheel speed sensor,
wherein:
the hub is provided with a bearing retaining portion for retaining a bearing that is fitted to the axle,
the pulser ring is provided with a rib, the rib extending inwardly, in a vehicle width direction, from a radially inner peripheral portion of the pulser ring,
the rib is provided with an abutting surface located close to a receiving portion of the hub, that is provided at an end surface outside of the bearing retaining portion in the vehicle width direction,
the pulser ring is mounted with respect to the wheel in a manner to form a gap between the rib and the receiving portion at the time of mounting, and
the gap is set to such a size that when the pulser ring is deformed toward the hub in an elastic deformation zone, the rib abuts on the receiving portion.

2. The pulser ring mounting structure according to claim 1, wherein the receiving portion extends in the axial direction of the axle, and the receiving portion is located close to the rib.

3. The pulser ring mounting structure according to claim 1,
wherein the hub is provided with a cylindrical portion, the cylindrical portion covering the axle from an outer peripheral side, and
the receiving portion is a plane, the plane being formed at an end of the cylindrical portion in the axial direction of the axle.

4. The pulser ring mounting structure according to claim 1, wherein in a thickness direction of the rib, the receiving portion is formed to have thickness greater than thickness of the rib.

5. The pulser ring mounting structure according to claim 1, wherein the rib is annularly and continuously provided.

6. The pulser ring mounting structure according to claim 1, wherein the pulser ring is provided with an insertion hole, the insertion hole allowing the axle to pass through the insertion hole, and
the rib is an annular wall portion, the annular wall portion extending in the axial direction of the axle from a peripheral edge portion of the insertion hole.

7. The pulser ring mounting structure according to claim 6, wherein the pulser ring is provided with the detected portion, the detected portion being formed in a position outside of the rib in a radial direction, and the pulser ring is provided with a fixing portion, the fixing portion being formed in a position outside of the detected portion in the radial direction, the fixing portion fixing the pulser ring to the wheel.

* * * * *